United States Patent
Liu et al.

(10) Patent No.: US 9,667,131 B2
(45) Date of Patent: May 30, 2017

(54) DIFFERENTIAL PROTECTION METHOD FOR BRIDGE CIRCUIT IN CURRENT CONVERTER CONTROL SYSTEM

(71) Applicants: XJ GROUP CORPORATION, Xuchang (CN); XUCHANG XJ SOFTWARE TECHNOLOGIES LTD, Xuchang (CN); XJ ELECTRIC CO., LTD, Xuchang (CN); XI'AN JIAOTONG UNIVERSITY, Xi'an (CN); STATE GRID CORPORATION OF CHINA, Beijing (CN)

(72) Inventors: Xing Liu, Xuchang (CN); Ruizhi Jiang, Xuchang (CN); Yuanhang Yang, Xuchang (CN); Guobing Song, Xuchang (CN); Guobin Li, Xuchang (CN); Xu Zhu, Xuchang (CN); Peiyao Liu, Xuchang (CN)

(73) Assignees: XJ GROUP CORPORATION, Xuchang (CN); XUCHANG XJ SOFTWARE TECHNOLOGIES LTD, Xuchang (CN); XJ ELECTRIC CO., LTD, Xuchang (CN); XI'AN JIAOTONG UNIVERSITY, Xi'an (CN); STATE GRID CORPORATION OF CHINA, Beijing (CN)

( * ) Notice: Subject to any disclaimer, the term of this patent is extended or adjusted under 35 U.S.C. 154(b) by 0 days.

(21) Appl. No.: 15/076,662

(22) Filed: Mar. 22, 2016

(65) Prior Publication Data
US 2017/0005569 A1 Jan. 5, 2017

(30) Foreign Application Priority Data
Jun. 30, 2015 (CN) .......................... 2015 1 0376839

(51) Int. Cl.
*H02M 1/32* (2007.01)
*H02M 7/521* (2006.01)
(Continued)

(52) U.S. Cl.
CPC ............. *H02M 1/32* (2013.01); *H02M 7/521* (2013.01); *H02M 7/12* (2013.01); *H02M 7/155* (2013.01); *H02M 2001/0009* (2013.01)

(58) Field of Classification Search
CPC .. H02M 1/32; H02M 2001/0009; H02M 7/12; H02M 7/155; H02M 7/162; H02M 7/521
See application file for complete search history.

(56) References Cited

U.S. PATENT DOCUMENTS 4,408,246 A * 10/1983 Ray ........................ H02H 7/263
361/62
4,423,459 A * 12/1983 Stich ........................ H02H 3/44
361/87

(Continued)

*Primary Examiner* — Jue Zhang
*Assistant Examiner* — Lakaisha Jackson
(74) *Attorney, Agent, or Firm* — Platinum Intellectual Property LLP

(57) ABSTRACT

The present invention relates to a differential protection method for bridge circuit in current converter control system, including the steps of: 1). obtaining sample values of the three-phase current for the current converter control system at AC side thereof, and calculating the absolute value of each sampling value respectively; 2). calculating a value of current at the AC side of the current converter control system; and 3). determining whether to perform a relay protection for the current converter control system according to the value current at the AC side of the current converter control system. The method of the present invention provided, is fast, convenient, and with a small amount of calculation. The current converter control system determines whether to perform a relay protection in a short time. Also (Continued)

it reduces the possibility that the equipment burned because of cannot break the circuit in time.

3 Claims, 5 Drawing Sheets

(51) Int. Cl.
*H02M 7/155* (2006.01)
*H02M 1/00* (2006.01)
*H02M 7/12* (2006.01)

(56) References Cited

U.S. PATENT DOCUMENTS

| | | | | |
|---|---|---|---|---|
| 2011/0316340 A1* | 12/2011 | Nakano | ............... | H02M 5/4585 307/43 |
| 2016/0072403 A1* | 3/2016 | Niwa | ..................... | G01R 31/40 363/89 |
| 2016/0248317 A1* | 8/2016 | Taguchi | ................. | H02M 1/32 |

* cited by examiner

Prior Art

```
┌─────────────────────────────────┐
│   Get the current time phase AC │
│   sampling value and absolute value: │
│        |ia(t)|、|ib(t)|、|ic(t)|  │
└─────────────────────────────────┘
                │
                ▼
┌─────────────────────────────────┐
│  iv(t)=(|ia(t)|+|ib(t)|+|ic(t)|)/2 │
└─────────────────────────────────┘
                │
                ▼
┌─────────────────────────────────┐
│         output   iv(t)          │
└─────────────────────────────────┘
```

Fig. 3

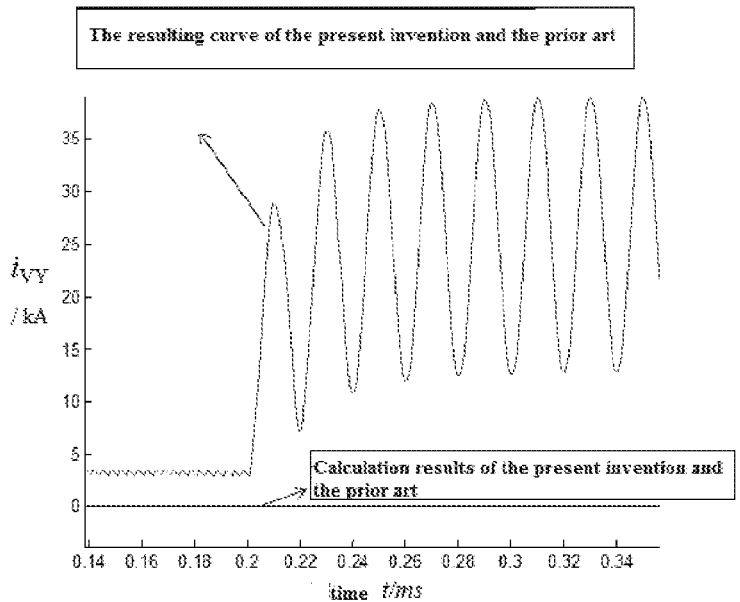

Fig. 4

DIFFERENTIAL PROTECTION METHOD FOR BRIDGE CIRCUIT IN CURRENT CONVERTER CONTROL SYSTEM

FIELD OF THE INVENTION

The present invention generally relates to a field of relay protection for current converter control system. More particularly, the present invention relates to a differential protection method for bridge circuit in current converter control system.

DESCRIPTION OF THE RELATED ART

The converter control system is widely used in new energy, DC transmission, chemical engineering, metallurgy, railway and other fields. As a linking tie between AC system and DC system, the performance of the relay protection device directly determines whether the current converter control system can operate safely. Therefore, it has great significance for an intensive study on improving the performance of the relay protection device. At present, differential protection method of bridge circuit is widely used as the main protection of short-circuit fault in valve area of current converter control system. The value of AC current, which is calculated by the sample values of the three-phase AC current in the current converter control system, is necessary. Process for calculation value of AC current of the current converter control system is a major source for calculation of protective program.

An existing calculating method of the value of AC current of the current converter control system is shown in FIG. 1. Sample values of the three-phase AC current for the current converter control system are obtained, and the absolute value of each sampling value is calculated respectively. The absolute values of the sample values are |ia(t)|, |ib(t)|, and |ic(t)| respectively. Firstly suppose $i_v(t)=|i_a(t)|$, then compare $i_v(t)$ with $|i_b(t)|$. When $i_v(t)$ is more than $|i_b(t)|$, we suppose $i_v(t)=|i_b(t)|$. Then, comparing $i_v(t)$ with $|i_c(t)|$, when $i_v(t)$ is more than $|i_c(t)|$, supposing $i_v(t)=|i_c(t)|$, here the $i_v(t)$ is the value of AC current. The $i_v(t)$ is sent to the relay protection device as a decision value. When $i_v(t)$ is not more than $|i_b(t)|$, $i_v(t)$ is compared with $|i_c(t)|$. When $i_v(t)$ is less than $|ic(t)|$, supposing $i_v(t)=|i_c(t)|$, here the $i_v(t)$ is the value of AC current. As a decision value, the AC current is sent to the relay protection device. When $i_v(t)$ is not less than $|i_c(t)|$, the $i_v(t)$ is the value of AC current. As a decision value, the AC current is sent to the relay protection device. In short, the method of calculating a value of current at the AC side aims to get the maximum absolute value of the three-phase current sample values. The method can calculate the present value of AC current, and determine whether performing a relay protection for the current converter control system according to the current value at the AC side of the current converter control system. However, the method is complex and takes a long time to calculate the AC current. A fault occurs in the current converter control system which can be burned in a very short period of time. Therefore, during the determining of relay protection device, the time which is taken to calculate a value of current at the AC side should be as short as possible.

SUMMARY

The purpose of the present invention is to provide a bridge differential protection method of the converter control system which is aimed at addressing the problem that the operation of relay protection device takes a long time.

To achieve the above purpose, in the first embodiment, the present invention is to provide a differential protection method for bridge circuit in current converter control system, including the steps of:

1). obtaining sample values of the three-phase current of the current converter control system at AC side, and calculating the absolute value of each sampling value respectively;

2). calculating the value of current at the AC side of the current converter control system in this way: $k_1$ times of the sum of three absolute values of sample values;

3). determining whether to perform a relay protection for the current converter control system according to the value current at the AC side of the current converter control system as follow:

If $||I_d-i_v|>k_2$, performing a relay protection;

wherein, $k_1$ is a number between 0 and 1, $I_d$ is the measurement value of direct current of the current converter control system, $i_v$ is the current value of AC side, and $k_2$ is a set value greater than 0.

In the second embodiment, the $k_1$ is equal to ½.

In the third embodiment, the $k_2=0.5\times I_{dN}$, wherein $I_{dN}$ is a rating value of DC current.

The method of the present invention provided calculates the AC current at present moment. Firstly, sample values of the three-phase current for the current converter control system at AC side thereof are obtained. Secondly, the absolute value of each sampling value is calculated respectively. Thirdly, a sum of the absolute value is calculated. Then, the AC current is calculated by the sum multiplying by a set value. Finally, a relay protection for the current converter control system is performed according to the value current at the AC side. The absolute values of the currents of sample values do not need to compare with each other one by one in the method of the present invention, but a sum of the absolute values is needed to be calculated. Then, the AC current is calculated by the sum multiplying by a set value. The method of the present invention provided is fast, convenient, and with a small amount of calculation.

The current converter control system makes a decision that whether the relay protection device implements relay protection action. The current converter control system makes the decision in a short time. The method of the present invention reduces the possibility that the current converter control system will be burned because of not breaking the circuit in time.

BRIEF DESCRIPTION OF THE DRAWINGS

FIG. 3 is a flowchart, shows current at the AC side is calculated of the method of the present invention.

FIG. 4 is a comparison chart of calculating results for present current valve at AC side through the method of the present invention and the prior method with an AG fault.

DETAILED DESCRIPTION OF EMBODIMENTS

A further illustration for the present invention is provided with figures.

Figure 1:
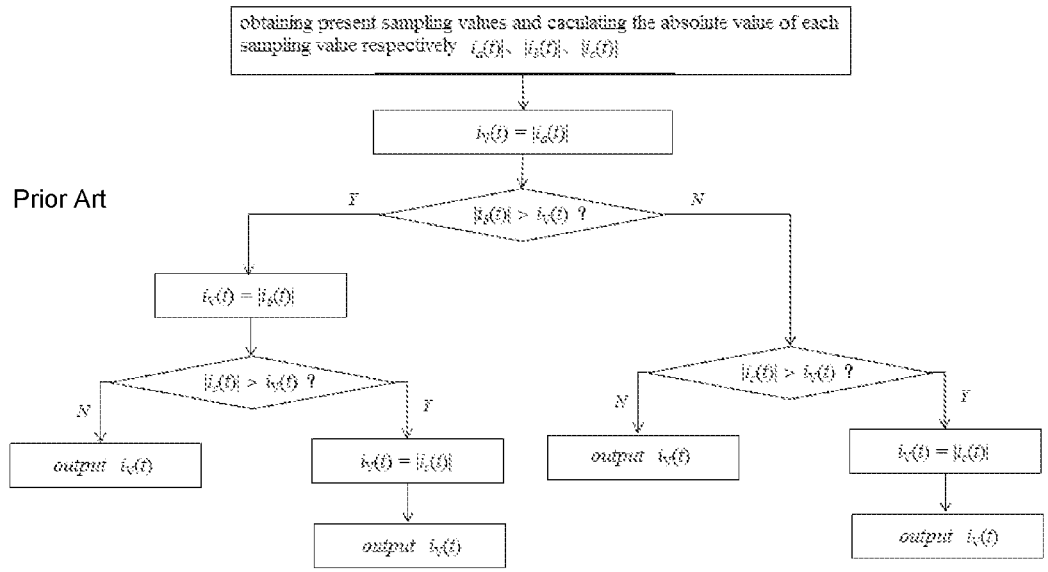
FIG. 1 is a flowchart, existing method of get the AC current.
Figure 2:
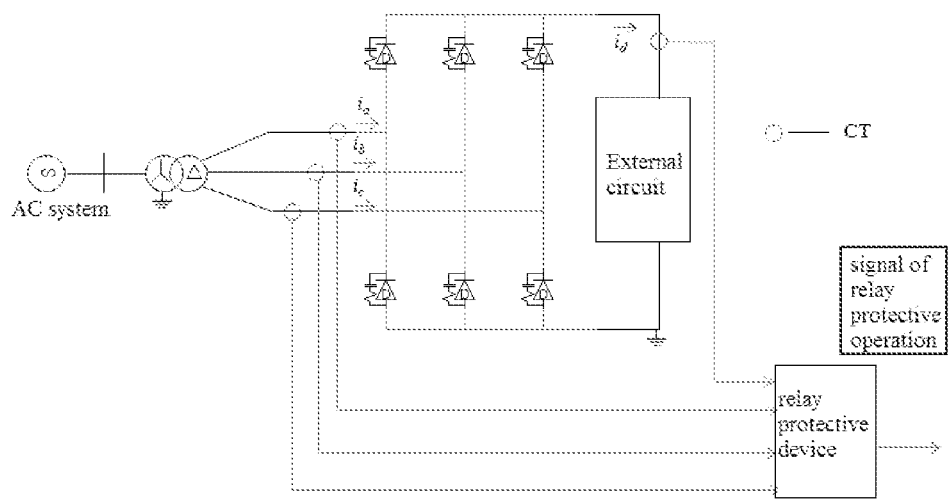
FIG. 2 is a structural representation, current converter control system.
Figure 5:
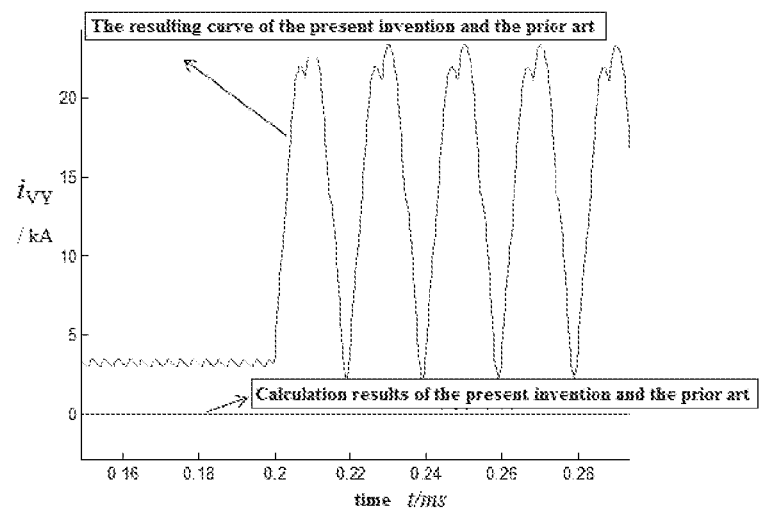
FIG. 5 is a comparison chart of calculating results for present current valve at AC side through the method of the present invention and the prior method with an ABC fault.
Figure 6:
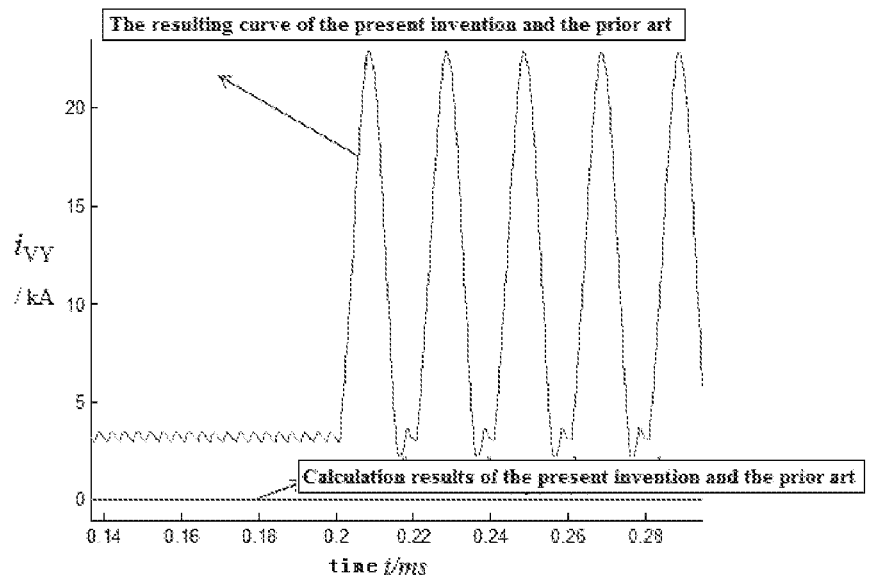
FIG. 6 is a comparison chart of calculating results for present current valve at AC side through the method of the present invention and the prior method with an AB fault.
Figure 7:
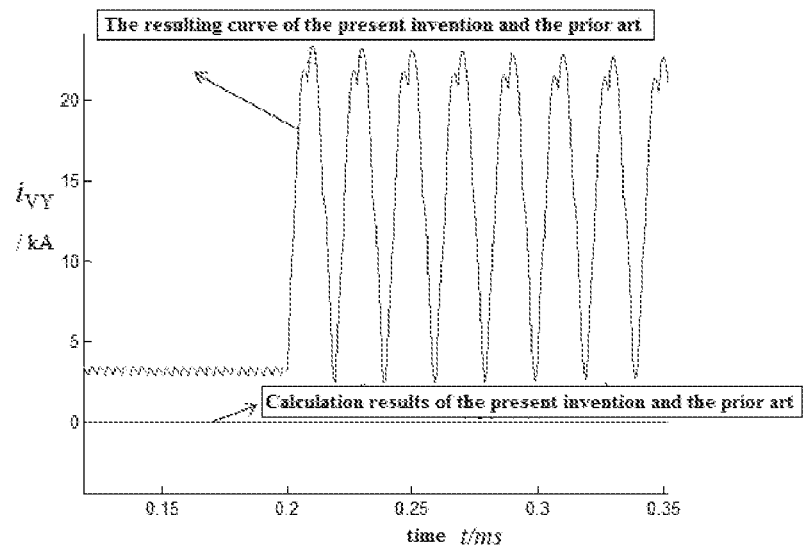
FIG. 7 is a comparison chart of calculating results for present current valve at AC side through the method of the present invention and the prior method with a single pole fault.
Figure 8:
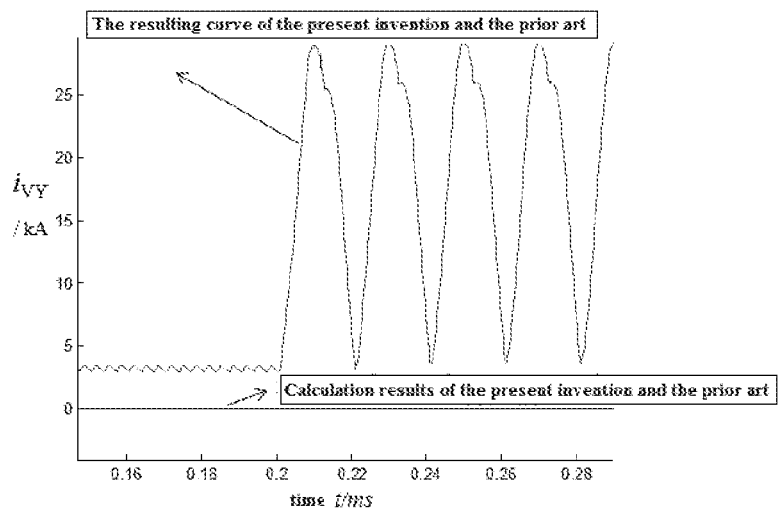
FIG. 8 is a comparison chart of calculating results for present current valve at AC side through the method of the present invention and the prior method with an ABG fault.

As shown in FIG. 2, it is a structural representation; of current converter control system. The current converter control system is a full-bridge rectifier. It has three upper-arms and three lower-arms. Input of current converter control system is a three-phase AC input, respectively, for the phase A, B and C. Each input of the three-phase AC has one upper-arm and one lower arm and every arm connects a thyristor, so that the current converter control system always has six thyristors. There are three current detection points on the three-phase input circuit of the current converter control system. An electric current collection device is set on each of the current detection point. A current sensor for collecting direct current is set on the DC output lines of the current converter control system. Three current detection points of input and collection points of output are all connected with the relay protection device. Relay protection device processes and calculates the current values of input and output and then determines whether to perform a relay protection for the current converter control system.

When the relay protection for the current converter control system is determining:

The current iv at AC side of the current converter control system is calculated firstly. There are two calculating methods with minor differences and the same principle.

1. As shown in FIG. 3.

Firstly half of the three-phase sample values $i_a$, $i_b$ and $i_c$ of the current converter control system at AC side are calculated respectively.

Secondly the corresponding absolute values of half of the sample values are calculated respectively.

Thirdly the current $i_V$ at AC side of current converter control system is calculated, which is the sum of the absolute values of half of the three-phase sample values. The formula can be expressed as: $i_V = |i_a|/2 + |i_b|/2 + |i_c|/2$.

2. Firstly sample values $i_a$, $i_b$ and $i_c$ of the three-phase current for the current converter control system at AC side thereof are obtained.

Secondly the corresponding absolute values of the sample values are calculated respectively.

Thirdly the current $i_V$ at AC side of current converter control system is calculated, which is the half times of the sum of the three-phase absolute. The formula can be expressed as: $i_V = (|i_a| + |i_b| + |i_c|)/2$.

The current $i_V$ at the AC side is calculated by one of the two methods above. The current converter control system determines whether to perform a relay protection for the current converter control system according to the value current $i_V$.

DC current rating is set as $I_{dN}$. Present DC current value is $I_d$. Then, operational equation is:

$$|I_d - i_v| > k_2$$

If $|I_d - i_v| > k_2$, then, the relay protection device actions; wherein $k_2 = 0.5 \times I_{dN}$.

At present, a fault whether or not occurring in the converter system is judged by the relay protective device according to the three-phase current sampling value. When a fault occurs in the current converter control system, the relay protection device emits a signal of relay protective operation, and implements relay protective operation. The judgment is based on the formula: $k_2 = 0.5 \times I_{dN}$ above. In other examples, the $k_2$ can also be set as other values greater than zero according to the required accuracy of the relay protective operation.

FIGS. 4, 5, 6, 7 and 8 are comparison charts for present current valve at AC side through the method of the present invention and the prior method, at the time of 0.2 s with a various of short-circuit faults.

FIGS. 4, 5, 6, 7 and 8 are constituted by three curves. One curve is the current of AC side of the present invention; another curve is the current of AC side of existing method; and the last curve is the resulting subtraction curve of above two curves.

Figure 9:
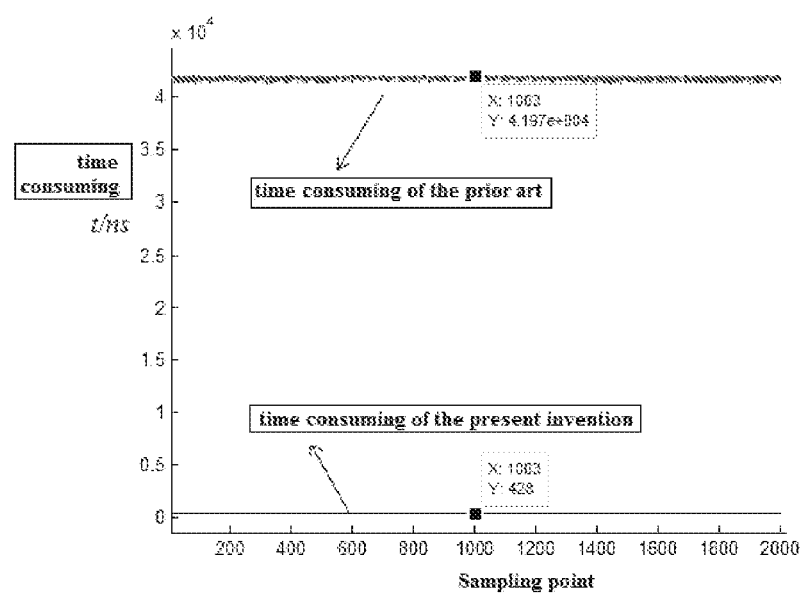
FIG. 9 is a comparison chart of computation time for calculating current valve at AC side through the method of the present invention and the prior method.

As can be seen from the figures, the curve obtained by the method of the present invention coincides with the curve obtained by prior method completely, and the difference of above two curves is zero. So that the method of obtaining AC current in the present invention replaces prior method, which will not bring any adverse effect on the calculation results. In addition, FIG. 9 is a comparison chart of computation time for current valve at AC side through the method of the present invention and the prior method. The time of the two methods consumed can be measured-on the Java platform. Time of minimum unit is ns.

Time Test procedure is:

long start=System. nano Time( ); % Program execution start time function; % Program long end=System.nanoTime( ); % Program execution end time time_cost=end-start; % Processed execution Take a cycle data to calculate and count time-consuming during calculation of each sample to obtain a time-consuming curve shown in FIG. 9.

It can be seen from the FIG. 9 that: 1) Since the value of the three-phase current is changing constantly, the prior method calculating current at the AC side will lead that the times of comparing amplitude calculation in every sampling calculation are not the same. Thus, there is wave character during the time consuming. This problem does not exist in the present invention. 2) The method calculating the AC current the present invention is only need to add. Therefore, it has a smaller amount and a faster speed of calculation. The amount of calculation in the present invention is about one percent of the existing method.

The current at the AC side is the half times of the sum of absolute sample values in the above-described example. The current at the AC side is the k1 times of the sum of absolute sample values in the other examples.

Wherein, $k_1$ is not limited to equal ½. The $k_1$ may be set any value including [0,1] according to the required accuracy actual of the relay protective operation.

In the above-described example, $i_V = |i_a|/2 + |i_b|/2 + |i_c|/2$. In the other examples, $i_V = |i_a|/n + |i_b|/n + |i_c|/n$. Wherein, n may be not equal to 2 but any value greater than 1, according to the required accuracy actual of the relay protective operation.

Although the embodiments of the present invention have been disclosed above, but it is not limited to the applications set forth in the specification and embodiments, and can be applied to various fields suitable for the present invention. For ordinary skilled person in the field, other various changed model, formula and parameter may be easily achieved without creative work according to instruction of the present invention, changed, modified and replaced embodiments without departing the general concept defined by the claims and their equivalent are still included in the present invention. The present invention is not limited to particular details and illustrations shown and described herein.

What is claimed is:

1. A differential protection method for bridge circuit in current converter control system, being characterized in that, the differential protection method includes the steps of:
   1). obtaining sample values of the three-phase current for the current converter control system at AC side thereof, and calculating the absolute value of each sampling value respectively;
   2). calculating the value of current at the AC side of the current converter control system by the step of: the value of current at the AC side being k1 times of the sum of three absolute values of sample values; and
   3). determining whether to perform a relay protection for the current converter control system according to the value current at the AC side of the current converter control system by the step of:

If $|Id-iv|>k2$, performing a relay protection;

wherein, k1 is a value between 0 to 1, Id is an actual measured value of direct current side of the current converter control system, iv is a current value of AC side, and k2 is a set value greater than 0.

2. The differential protection method for bridge circuit in current converter control system of claim 1, being characterized in that, the k1 is equal to ½.

3. The differential protection method for bridge circuit in current converter control system of claim 1, being characterized in that, the k2=0.5×IdN, where in, IdN is a rating value of DC current.

* * * * *